United States Patent [19]
Hulme et al.

[11] Patent Number: 5,968,338
[45] Date of Patent: Oct. 19, 1999

[54] PROCESS FOR RECOVERING ONIUM HYDROXIDES FROM SOLUTIONS CONTAINING ONIUM COMPOUNDS

[75] Inventors: David R. Hulme; Roger Moulton, both of Austin; Wilfred W. Wilson, Bastrop; Mark Hellums, Austin, all of Tex.

[73] Assignee: Sachem, Inc., Austin, Tex.

[21] Appl. No.: 09/009,319

[22] Filed: Jan. 20, 1998

[51] Int. Cl.$^6$ .................................................. C02F 1/461
[52] U.S. Cl. .................... 205/703; 205/746; 204/522; 204/530; 204/537; 204/541
[58] Field of Search ................... 204/520, 522, 204/530, 537, 541; 205/688, 703, 746

[56] References Cited

U.S. PATENT DOCUMENTS

| | | | |
|---|---|---|---|
| 4,572,769 | 2/1986 | Shimuzu | 204/59 |
| 4,634,509 | 1/1987 | Shimuzu et al. | 204/182.4 |
| 4,714,530 | 12/1987 | Hale et al. | 204/131 |
| 4,880,513 | 11/1989 | Davis et al. | 204/182.4 |
| 4,917,781 | 4/1990 | Sharifian et al. | 204/72 |
| 4,938,854 | 7/1990 | Sharifian et al. | 204/130 |
| 5,286,354 | 2/1994 | Bard et al. | 204/86 |
| 5,352,345 | 10/1994 | Byszewski et al. | 204/182.4 |
| 5,354,434 | 10/1994 | Satoh et al. | 204/72 |
| 5,389,211 | 2/1995 | Sharifian et al. | 204/72 |
| 5,405,508 | 4/1995 | Kawakami et al. | 204/102 |
| 5,439,564 | 8/1995 | Shimuzu et al. | 204/102 |
| 5,545,309 | 8/1996 | Shimuzu et al. | 205/437 |
| 5,709,790 | 1/1998 | Sharifian et al. | 205/437 |
| 5,833,832 | 11/1998 | Shay et al. | 205/413 |

FOREIGN PATENT DOCUMENTS

| | | | |
|---|---|---|---|
| 60-131985 | 7/1985 | Japan | C25B 3/00 |
| 60-131986 | 7/1985 | Japan | C25B 3/00 |
| 4228587 | 8/1992 | Japan | C25B 3/04 |
| 5106074 | 8/1993 | Japan | H01L 21/027 |

*Primary Examiner*—Arun S. Phasge
*Assistant Examiner*—Thomas H Parsons
*Attorney, Agent, or Firm*—Renner, Otto, Boisselle & Sklar

[57] ABSTRACT

In one embodiment, the present invention relates to a process for recovering an onium hydroxide from a solution containing an onium compound, including contacting the solution with a cation exchange material so that at least a portion of onium cations from the onium compound are adsorbed by the cation exchange material; contacting an acid with the cation exchange material to elute an onium salt; charging the onium salt to an electrochemical cell containing at least three compartments, a cathode, an anode, and in order from the anode to the cathode, a bipolar membrane and a cation selective membrane, and passing a current through the cell whereby the onium hydroxide is regenerated; and recovering the onium hydroxide from the cell. In another embodiment, the present invention relates to a process for recovering an onium hydroxide from a solution containing an onium compound, including contacting the solution with a cation exchange material so that at least a portion of onium cations from the onium compound are adsorbed by the cation exchange material; contacting an acid with the cation exchange material to elute an onium salt; charging the onium salt to an electrochemical cell containing at least two compartments, a cathode, an anode, and an anion selective membrane therebetween, and passing a current through the cell whereby the onium hydroxide is regenerated; and recovering the onium hydroxide from the cell.

34 Claims, 1 Drawing Sheet

PROCESS FOR RECOVERING ONIUM HYDROXIDES FROM SOLUTIONS CONTAINING ONIUM COMPOUNDS

TECHNICAL FIELD

This invention relates to processes for regenerating onium hydroxides from solutions containing onium compounds. In particular, the invention relates to processes for regenerating onium hydroxides using a cation exchange material and an electrochemical cell from solutions containing onium hydroxides and/or onium salts.

BACKGROUND OF THE INVENTION

Onium hydroxides, such as quaternary ammonium hydroxides including tetramethylammonium hydroxide (TMAH) and tetraethylammonium hydroxide (TEAH), are strong organic bases that have been known for many years. Quaternary ammonium hydroxides have found a variety of uses including use in zeolite manufacture and polymer manufacture. Aqueous solutions of quaternary ammonium hydroxides, particularly TMAH solutions, have also been used extensively as a developer for photoresists in printed circuit board and microelectronic chip fabrication. For a variety of reasons, it is desirable to minimize the overall amount of developer used in printed circuit board and microelectronic chip fabrication. One way to minimize the overall amount of hydroxide developer is to reuse the waste developer. Reusing developer reduces the amount lost and decreases disposal problems.

Waste developer contains impurities including ionic impurities and nonionic impurities. Ionic impurities include various metal cations such as sodium, potassium, zinc, nickel, aluminum, copper and calcium; and anions such as halides, nitrates, nitrites, carbonates, carboxylates, sulfates. Nonionic impurities include photoresists, surfactants, amines and numerous other organic molecules. Waste developer also contains relatively low concentrations of the hydroxide developer. Accordingly, there remains a continuing need to effectively recover hydroxide developer in a useable form so that it may be reused thereby minimizing the overall amount of developer used in printed circuit board and microelectronic chip fabrication.

U.S. Pat. No. 4,714,530 (Hale et al) describes an electrolytic process for preparing high purity quaternary ammonium hydroxides which utilizes a cell containing a catholyte compartment and an anolyte compartment separated by a cation-exchange membrane. The process comprises charging an aqueous solution of a quaternary ammonium hydroxide to the anolyte compartment, adding water to the catholyte compartment, and passing a direct current through the electrolysis cell to produce a higher purity quaternary ammonium hydroxide in the catholyte compartment which is subsequently recovered. The '530 patent also describes an improvement which comprises heating the quaternary ammonium hydroxide at an elevated temperature prior to charging the hydroxide to the anolyte compartment of the electrolytic cell.

U.S. Pat. No. 4,938,854 (Sharifian et al) also describes an electrolytic process for purifying quaternary ammonium hydroxides by lowering the latent halide content. The electrolytic cell may be divided into an anolyte compartment and a catholyte compartment by a divider which may be an anion or cation selective membrane. The cathode in the catholyte compartment comprises zinc, cadmium, tin, lead, copper or titanium, or alloys thereof, mercury or mercury amalgam. Japanese Kokai Patent No. 60-131985 (1985) (Takahashi et al) describes a method of manufacturing a high purity quaternary ammonium hydroxide in an electrolysis cell which is divided into an anode chamber and a cathode chamber by a cation exchange membrane. A quaternary ammonium hydroxide solution containing impurities is charged to the anode chamber and a direct current is supplied between two electrodes after water has been charged to the cathode chamber. Purified quaternary ammonium hydroxide is obtained from the cathode chamber. The purified quaternary ammonium hydroxide contains reduced amounts of alkali metals, alkaline earth metals, anions, etc.

U.S. Pat. Nos. 5,439,564 and 5,545,309 (Shimizu et al) relate to methods of processing waste liquid containing an organic quaternary ammonium hydroxide by contacting the waste liquid with a cation-exchanging material, eluting organic quaternary ammonium cations from the cation-exchanging material, and electrolyzing the eluate in a two chamber electrolytic cell equipped with an anode, cathode and cation-exchanging membrane. Organic quaternary ammonium hydroxide is obtained from the cathode chamber of the electrolytic cell.

SUMMARY OF THE INVENTION

In one embodiment, the present invention relates to a process for recovering an onium hydroxide from a solution containing an onium compound, including contacting the solution with a cation exchange material so that at least a portion of onium cations from the onium compound are adsorbed by the cation exchange material; contacting an acid with the cation exchange material to elute an onium salt; charging the onium salt to an electrochemical cell containing at least three compartments, a cathode, an anode, and in order from the anode to the cathode, a bipolar membrane and a cation selective membrane, and passing a current through the cell whereby the onium hydroxide is regenerated; and recovering the onium hydroxide from the cell.

In another embodiment, the present invention relates to a process for recovering an onium hydroxide from a solution containing an onium compound, including contacting the solution with a cation exchange material so that at least a portion of onium cations from the onium compound are adsorbed by the cation exchange material; contacting an acid with the cation exchange material to elute an onium salt; charging the onium salt to an electrochemical cell containing at least two compartments, a cathode, an anode, and an anion selective membrane therebetween, and passing a current through the cell whereby the onium hydroxide is regenerated; and recovering the onium hydroxide from the cell.

In yet another embodiment, the present invention relates to a process for recovering a quaternary ammonium hydroxide from a solution containing a quaternary ammonium compound, including contacting the solution with a cation exchange material so that at least a portion of the quaternary ammonium cations from the quaternary ammonium compound are adsorbed by the cation exchange material; contacting an inorganic acid with the cation exchange material to elute a quaternary ammonium salt; charging the quaternary ammonium salt to an electrochemical cell containing at least four compartments, a cathode, an anode, and in order from the anode to the cathode, a bipolar membrane, an anion selective membrane and cation selective membrane, and passing a current through the cell whereby the quaternary ammonium hydroxide is regenerated; and recovering the quaternary ammonium hydroxide from the cell.

In still yet another embodiment, the present invention relates to a process for recovering tetramethylammonium hydroxide from a waste solution containing a tetramethylammonium compound, including contacting the waste solution with a cation exchange resin so that at least a portion of the tetramethylammonium cations from the tetramethylammonium compound are adsorbed by the resin; contacting an inorganic acid with the cation exchange resin to elute a tetramethylammonium salt; charging the tetramethylammonium salt to an electrochemical cell containing at least five compartments, a cathode, an anode, and in order from the anode to the cathode, a first bipolar membrane, an anion selective membrane, a cation selective membrane and a second bipolar membrane, and passing a current through the cell whereby tetramethylammonium hydroxide is regenerated; and recovering tetramethylammonium hydroxide from the cell.

As a result of the processes of the claimed invention, recycled solutions of onium hydroxides can be obtained in which the concentration and purity is increased. Recycling spent solutions of onium hydroxides provides not only cost savings, but also environmental benefits by eliminating the need for synthesizing new hydroxide compound solutions and associated expensive purification processes and reducing the toxicity of waste solution effluents. An increased amount of water can be recovered after onium hydroxides are removed from solution. Additionally, it is not necessary to store large amounts of chemicals. The relatively high concentration and purity of onium hydroxide solutions obtainable via the present invention can effectively be used in numerous applications where onium hydroxide solutions are required.

DESCRIPTION OF THE PREFERRED EMBODIMENTS

Figure 1:
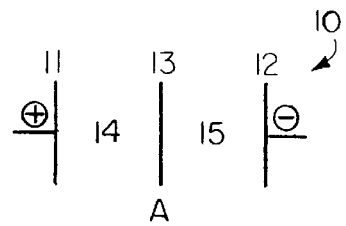
FIG. 1 is a schematic representation of a two compartment electrochemical cell containing one unit cell in accordance with the present invention.

In accordance with the process of the present invention, the onium hydroxides are regenerated (produced, purified or recycled) from solutions containing an onium hydroxide and/or onium salt. As used herein, an onium compound is a compound containing an onium cation, such as at least one of an onium hydroxide and an onium salt. In one embodiment, the solution containing an onium compound is a waste solution of an onium hydroxide after it has been used in a process, especially in developing processes associated with printed circuit board and microelectronic chip fabrication. As a result of such processes, impurities enter and contaminate the solution. In other words, the solution containing an onium compound may be a spent waste solution of an onium hydroxide. In another embodiment, the solution containing an onium compound is a waste solution of an onium salt after it has been used in a process. The solution or waste solution may contain other compounds, such as the impurities described above and below and/or an onium salt corresponding to an onium hydroxide.

The solutions containing onium compounds which are treated in accordance with the process of the present invention are mixtures, preferably solutions, containing an oxidizable liquid and from about 0.01% to about 50% by weight of the onium compound and generally will contain varying amounts of one or more undesirable impurities, for example, anions such as halide, carbonate, formate, nitrite, nitrate, sulfate, etc., some cations such as metals including zinc and calcium, sodium, potassium and some neutral species such as photoresists, methanol, amines, etc. The oxidizable liquid may be water, mixtures of water and an organic liquid, or an organic liquid. Organic liquids include alcohols, such as methanol and ethanol, glycols and the like.

In one embodiment, the process of the present invention is effective in reducing the amount of both ionic and nonionic impurities present in solutions of onium compounds, such as a solution of a quaternary ammonium hydroxide, while yielding onium hydroxides of high purity. In a further embodiment, the process of the present invention results in a reduction of metal ion impurities as well as organic impurities in a solution of an onium compound, such as a quaternary ammonium hydroxide, while yielding onium hydroxides of high purity. In another embodiment the process of the present invention is useful in preparing purified onium hydroxides such as quaternary ammonium hydroxides, quaternary phosphonium hydroxides and tertiary sulfonium hydroxides.

The onium hydroxides may generally be characterized by the formula

$$A(OH)_x \quad (I)$$

wherein A is an onium group and x is an integer equal to the valence of A. Examples of onium groups include ammonium groups, phosphonium groups, and sulfonium groups. In one embodiment, the onium hydroxide should be sufficiently soluble in a solution such as water, alcohol or other organic liquid, or mixtures thereof to permit a useful recovery rate.

The quaternary ammonium hydroxides and quaternary phosphonium hydroxides may be characterized by the formula

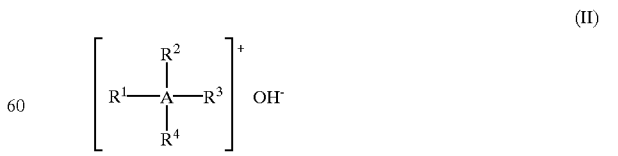

(II)

wherein A is a nitrogen or phosphorus atom, $R^1$, $R^2$, $R^3$ and $R^4$ are each independently alkyl groups containing from 1 to about 20 carbon atoms, hydroxy alkyl or alkoxy alkyl groups containing from 2 to about 20 carbon atoms, aryl groups, or hydroxy aryl groups, or $R^1$ and $R^2$ together with A may form a heterocyclic group provided that if the heterocyclic group contains a C=A group, $R^3$ is the second bond.

The alkyl groups $R^1$ to $R^4$ may be linear or branched, and specific examples of alkyl groups containing from 1 to 20 carbon atoms include methyl, ethyl, propyl, butyl, pentyl, hexyl, heptyl, octyl, isooctyl, nonyl, decyl, isodecyl, dodecyl, tridecyl, isotridecyl, hexadecyl and octadecyl groups. $R^1$, $R^2$, $R^3$ and $R^4$ also may be hydroxyalkyl groups such as hydroxyethyl and the various isomers of hydroxypropyl, hydroxybutyl, hydroxypentyl, etc. In one preferred embodiment, $R^1$, $R^2$, $R^3$ and $R^4$ are independently alkyl groups containing one to ten carbon atoms and hydroxyalkyl groups containing from two to three carbon atoms. Specific examples of alkoxyalkyl groups include ethoxyethyl, butoxymethyl, butoxybutyl, etc. Examples of various aryl and hydroxyaryl groups include phenyl, benzyl, and equivalent groups wherein benzene rings have been substituted with one or more hydroxy groups.

The quaternary ammonium hydroxides which can be recycled or purified in accordance with the process of the present invention may be represented by Formula III

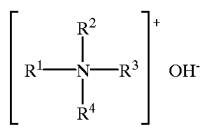

(III)

wherein $R^1$, $R^2$, $R^3$ and $R^4$ are as defined in Formula II. In one preferred embodiment, $R^1$–$R^4$ are alkyl groups containing from 1 to about 4 carbon atoms and hydroxyalkyl groups containing 2 or 3 carbon atoms. Most often the quaternary ammonium hydroxides purified in accordance with the process of the invention will be tetramethylammonium hydroxide (TMAH) or tetraethylammonium hydroxide (TEAH). Specific examples of such ammonium hydroxides include tetramethylammonium hydroxide, tetraethylammonium hydroxide, tetrapropylammonium hydroxide, tetrabutylammonium hydroxide, tetra-n-octylammonium hydroxide, methyltriethylammonium hydroxide, diethyldimethylammonium hydroxide, methyltripropylammonium hydroxide, methyltributylammonium hydroxide, cetyltrimethylammonium hydroxide, trimethylhydroxyethylammonium hydroxide, trimethylmethoxyethylammonium hydroxide, dimethyidihydroxyethylammonium hydroxide, methyltrihydroxyethylam-monium hydroxide, phenyltrimethylammonium hydroxide, phenyltriethylam-monium hydroxide, benzyltrimethylammonium hydroxide, benzyltriethylam-monium hydroxide, dimethylpyrolidinium hydroxide, dimethylpiperidinium hydroxide, diisopropylimidazolinium hydroxide, N-alkylpyridinium hydroxide, etc.

Examples of quaternary phosphonium hydroxides representative of Formula II wherein A=P which can be purified in accordance with the process of the present invention include tetramethylphosphonium hydroxide, tetraethylphosphonium hydroxide, tetrapropylphosphonium hydroxide, tetrabutylphosphonium hydroxide, trimethylhydroxyethylphosphonium hydroxide, dimethyldihydroxyethylphosphonium hydroxide, methyltrihy-droxyethylphosphonium hydroxide, phenyltrimethylphosphonium hydroxide, phenyltriethylphosphonium hydroxide and benzyltrimethylphosphonium hydroxide, etc.

In another embodiment, the tertiary sulfonium hydroxides which can be recycled or purified in accordance with this invention may be represented by the formula

(IV)

wherein $R^1$, $R^2$ and $R^3$ are each independently alkyl groups containing from 1 to about 20 carbon atoms, hydroxy alkyl or alkoxy alkyl groups containing from 2 to about 20 carbon atoms, aryl groups, or hydroxy aryl groups, or $R^1$ and $R^2$ together with S may form a heterocyclic group provided that if the heterocyclic group contains a C=S group, $R^3$ is the second bond.

Examples of the tertiary sulfonium hydroxides represented by Formula IV include trimethylsulfonium hydroxide, triethylsulfonium hydroxide, tripropylsulfonium hydroxide, etc.

Onium hydroxides are commercially available. Additionally, onium hydroxides can be prepared from the corresponding onium salts such as the corresponding onium halides, carbonates, formates, sulfates and the like.

Various methods of preparation are described in U.S. Pat. Nos. 4,917,781 (Sharifian et al) and 5,286,354 (Bard et al) which are hereby incorporated by reference. There is no particular limit as to how the onium hydroxide is obtained or prepared.

The onium salts are represented by a combination of any of the onium cations described above and a salt anion or acid anion. Referring to any one of Formula I to IV, an onium salt is represented when the OH⁻ anion is replaced with a salt or acid anion. Salt anions include acetates, halides (fluorides, chlorides, bromides and iodides), bicarbonates and carbonates, formates, nitrates, phosphates, sulfates and the like.

Prior to contact with a cation exchange material, the solutions containing the onium hydroxide and/or onium salts and/or impurities may be optionally concentrated or otherwise pretreated. That is, the concentration of the onium hydroxide and/or onium salt in the solution may be increased prior to contact with the cation exchange material and/or various impurities may be removed from the onium compound solution.

In some embodiments, it is preferable to concentrate the solution of the onium hydroxide and/or onium salt prior to contact with the cation exchange material. Concentration procedures are known to those skilled in the art and include evaporation, distillation, nanofiltration and reverse osmosis among others. Similarly, these concentration procedures may optionally be used to concentrate the onium salt solution (further described below) charged to the feed compartment of an electrochemical cell.

In other embodiments, it is preferable to pretreat the solution of the onium compound with some form of filtration prior to contact with the cation exchange material in accordance with the invention. Various types of filtration can be performed including gravity filtration, microfiltration such as nanofiltration, cross-flow filtration, cartridge filtration, vacuum filtration and pressure induced filtration. Related straining and screening pretreatments may also be performed. Filter membranes can be made of known materials useful for separating solids from liquids including plastics such as PTFE, PVDF, PET, nylons, polyethylene and polypropylene, cellulose acetate, cellulose nitrate, regenerated cellulose, nitrocellulose, paper including ashless paper, various fibers including glass fibers, and various particulates including activated carbon, silica, sand, etc. Alternatively, pretreatment can involve contacting the solution of the onium compound with various particulate materials, for example activated carbon, so that organic impurities are adsorbed and thus removed from solution by the particulate material.

In some embodiments, more than one type (or pass) of a filtration pretreatment can be performed as each filtration pretreatment may remove a different species of impurity. For example, in one embodiment two filtration pretreatments are performed: organic impurities are substantially or partially removed by gravity filtration and metal impurities are substantially or partially removed by another pass of gravity filtration after increasing the pH of the solution causing certain metals to form insoluble hydroxide salts thereby facilitating filtration (and thus separation of the insoluble species).

In other embodiments, it is preferable to pretreat the solution of the onium compound with some form of metal treatment prior to contact with the cation exchange material in accordance with the invention. A metal pretreatment removes excess metal impurities from the solution of the onium compound. In one embodiment, metal pretreatment involves contacting a solution of the onium compound with a preliminary ion exchange material for metal removal. The preliminary ion exchange material is preferably a preliminary cation exchange material which can selectively discriminate between metal cations and onium cations so that at least a portion of metal ion impurities in the solution of the onium compound is adsorbed by the preliminary ion exchange material. For example, a preliminary ion exchange material, for which sodium has an affinity, can be used as a metal pretreatment to remove sodium from the solution of the onium compound prior to contact with the cation exchange material in accordance with the invention.

In another embodiment, metal pretreatment involves contacting a solution of the onium compound with a metal complexing compound. Metal complexing compounds adsorb, bond to, complex, coordinate, chelate or otherwise engage at least a portion of the metal ion impurities in the solution of the onium compound thereby removing them prior to contact with the cation exchange material in accordance with the invention. Examples of metal complexing compounds include crown ethers, cryptands and chelating compounds (diamines, diketonates, etc).

In yet another embodiment, metal pretreatment involves contacting a solution of the onium compound with an acid or salt capable of forming an insoluble precipitate (at least partially insoluble) with a metal cation thereby enabling easy removal of the precipitate and thus the metal from solution prior to contact with the cation exchange material in accordance with the invention.

According to the present invention, a solution containing an onium compound is contacted with a cation exchange material so that the cation exchange material adsorbs onium cations in the solution (cations derived from onium hydroxide and/or onium salt). The cation exchange material may be any ion exchange material which efficiently adsorbs onium cations derived from onium compounds. The cation exchange material may be either a weakly acidic cation exchange material or a strongly acidic cation exchange material. The base of the cation exchange material may be either an organic cation exchange material such as a cation exchange resin or an inorganic cation exchange material such as zeolite, silica gel or the like.

The cation exchange material may be in the form of anyone of a powder, pellets, granuoles, films and/or fibrous materials. Two or more cation exchange materials may be combined, for example, as a combination of a weakly acidic cation exchange material and a strongly acidic cation exchange material, a combination of an inorganic cation exchange material and an organic cation exchange material, a combination of two or more cation exchange materials each in a different form, such as a powder and a fiber, depending upon the identity and properties of the onium compound solution. Given the handleability, economical aspects and ion-exchange capacity of the cation exchange materials, preferred are granular weakly acidic cation exchange resins and/or strongly acidic cation exchange resins.

Examples of the cation exchange material include gelled or porously-shaped cation exchange resins produced by introducing sulfonic acid groups or carboxylic acid groups into a polymer or copolymer base of, for example, styrenic polymers or copolymers such as polystyrene and the like, acrylic polymers or copolymers such as polyacrylic resins and the like, methacrylic polymers and copolymers such as polymethacrylic resins and the like and tetrafluorethylenic polymers or copolymers such as polytetrafluoroethylene and the like, or into a modified polymer or copolymer base to be prepared by modifying the polymers or copolymers with a crosslinking agent such as divinylbenzene or the like. The cation exchange materials further include phosphoric and phosphorous acid resins as well as inorganic cation exchange materials such as zeolite, silica gel and the like.

Specific preferred examples include cation exchange resins sold under the trade designations AMBERLITE® and DOWEX® from Rohm & Haas Co. and Dow Chemical Co., respectively. More specific examples include those under the trade designation AMBERLITE, such as IR-100, IR-105, IR-105 G, IR-112, IR-120, IR-122, IR-124, IRC-50, IRC-76, and IRC-84SP and under the trade designation DUOLITE, such as C-280, C-291, C-433 and C-464 from Rohm & Haas Co.; C-464 from Sumitomo Chemical Co.; those under the trade designation DOWEX, such as HGRW2, HCR-S, HGRW2, MWC-1, 50WX2, 50WX4, and 50WX8 and those under the trade designation MONOSPHERE DOWEX, such as C350, C500 and C650 from Dow Chemical Co.; lonac CC and C-267 from Sybron; various cation exchange resins from Organo Co.; and those under the designation DIAION, such as PK216H, PK212, PK 228, HPK25, SK-1BS, SK-104, SK-112, SK-112, SK-116, WK20, WK40 and WK100 from Mitsubishi Kasei Corp. In a preferred embodiment, the cation exchange resin is at least one of IRC-84SP from Rohm & Haas Co.; MONOSPHERE DOWEX C350, C500 and C650 from Dow Chemical Co.; and PK216H, PK212 and WK40 from Mitsubishi Kasei Corp.

Any known method may be employed, in accordance with the identity and form of the cation exchange material, for contacting the solution containing an onium hydroxide and/or an onium salt with the cation exchange material. For instance, a column system may be employed where the solution containing the onium compound is continuously passed through a column filled with a cation exchange material, and a batch system where a cation exchange material is added to the solution containing the onium compound so that the latter is brought into contact with the former by stirring them and thereafter the blend is filtered for solid-liquid separation.

An acid is then contacted with the cation exchange material in any manner so that the onium cations previously adsorbed by the cation exchange material are eluted and removed therefrom. In embodiments where a column system is employed, the acid may be added to the column in a co-current or countercurrent fashion. Since hydronium ions replace onium ions, a fresh cation exchange material is available for re-use in the inventive process.

The selection of acid for use in the eluting step is determined in accordance with the identity of the cation exchange material, the identity of the onium cation, and in relation to the step involving an electrochemical cell. The acid may be selected from inorganic acids such as hydrochloric acid, hydrobromic acid, nitric acid, sulfuric acid, carbonic acid, phosphoric acid, phosphorous acid and the like and organic acids such as acetic acid, formic acid, oxalic acid and the like. In one embodiment, the acid has a $PK_a$ of less than about 5, and preferably a $PK_a$ of less than about 4. The concentration of the acid may vary broadly, and it may be selected from a broad range form above about 0.01% to above about 20%. The acid is preferably an inorganic acid. In particular, more preferred is carbonic acid, hydrochloric acid or a diluted sulfuric acid having a concentration from above about 0.05% or above about 2.0%.

An acid is contacted with the cation exchange material thereby eluting an onium salt. The onium salt eluted from the cation exchange material is at least partially constituted by a compound containing an onium cation (derived from the onium hydroxide and/or onium salt in the solution initially contacted with the cation exchange material) and an anion (derived from the acid contacted with the cation exchange material).

The onium salts eluted include salts constituted by the onium cation and any of the corresponding acid anions listed above. Specific typical examples include at least one of an onium bicarbonate, an onium chloride, an onium bromide, an onium nitrate, an onium phosphate, an onium formate, an onium acetate and an onium sulfate, or any salt corresponding to any of the acid anions inherently listed above.

When the onium salt is eluted from the cation exchange material, it is desirable to minimize the amount of acid collected. Although in most embodiments some acid is always collected, the amount of acid collected can be minimized by varying the flow rate of the acid and the concentration of the acid and onium compound contacted with the cation exchange material. Desirable flow rates and concentrations vary depending upon the identity of the cation exchange material as well as the identity of the onium cation and acid. Flow rates and concentration levels can be determined by one skilled in the art.

In accordance with the process of the present invention, onium hydroxides such as those described above are regenerated (produced, purified or recycled) in a process involving an electrochemical cell. The electrochemical cell may involve electrolysis in an electrolytic cell or electrodialysis in an electrodialytic cell. The electrochemical cells, generally speaking, contain at least either an anode, a cathode, and an anion selective membrane, or an anode, a cathode, a cation selective membrane and a bipolar membrane, either of which may have one or more unit cells assembled for operational positioning between the anode and the cathode. A number of electrolytic and electrodialytic cells containing various unit cells and multiple unit cells are described herein which are useful in the process of the present invention. Multiple unit cells may be defined by a number of compartments between an anode and a cathode, or multiple unit cells may be defined by a number of compartments including an anode and cathode. Multiple unit cells including an anode and cathode may take a monopolar configuration, or a bipolar configuration. There is no particular limit to the number of unit cells which can be used. Nevertheless, in one embodiment, electrochemical cells which are used according to the present invention contain from 1 to about 25 unit cells, and preferably from 1 to about 10 unit cells.

The unit cells may contain at least either two or three compartments defined by the anode, cathode, and at least one of an anion selective membrane, cation selective membrane and bipolar membrane which may act as microporous diffusion barriers, filters, or have controlled pore size or pore size distribution allowing or not allowing certain ions to pass therethrough. The various anion selective membrane, cation selective membrane and bipolar membrane useful in the electrochemical cells used in the invention are described more fully below.

Electrochemical cells according to the present invention contain at least either two compartments or three compartments. Electrochemical cells containing at least two compartments generally have a feed compartment and an acid compartment. Electrochemical cells containing at least three compartments generally have a feed compartment, a recovery compartment and at least one of an acid compartment and a buffer compartment. Optionally, electrochemical cells according to the present invention may additionally contain a pass compartment. In certain embodiments, an electrochemical cell according to the present invention may have two or more of each of the compartments described above. In other embodiments, the electrochemical cell may have two or more of one or more of the compartments listed above. For example, in one embodiment, an electrochemical cell may have a feed compartment, two buffer compartments and a recovery compartment.

A solution is charged to each compartment. The solution may be aqueous based, alcohol or glycol based, another organic solution or combinations thereof. In other words, the solutions may contain water, mixtures of water and an organic liquid, or an organic liquid, where the organic liquids include alcohols, such as methanol and ethanol, glycols and the like. In a preferred embodiment, the solution charged into each compartment is an aqueous solution.

The solution charged into the feed compartment contains the onium salt eluted from the cation exchange material. The concentration of the onium salt initially charged into the feed compartment is in the range from about 0.1 M to about 6 M. In a preferred embodiment, the concentration of the onium salt in the solution charged into the feed compartment is from about 0.5 M to about 1.5 M. In electrochemical cells containing two or more feed compartments, the concentrations of the onium salt in the solutions charged into the feed compartments may be the same or different for each feed compartment. The feed compartment, as the term implies, initially holds the onium salt solution containing onium cations originating from the solution initially contacted with the cation exchanging material which is to be processed by the present invention.

In some embodiments, purified onium hydroxide is recovered from the feed compartment. For example, in an embodiment involving an electrochemical cell containing only an anion selective membrane, purified onium hydroxide is recovered from the feed compartment (defined by the anion selective membrane and the cathode) after application of an electric current. Analogously, in an embodiment involving an electrochemical cell containing an anion selective membrane and a first and second bipolar membranes, purified onium hydroxide is recovered from the feed compartment (defined by the anion selective membrane and one of the bipolar membranes) after application of an electric current.

The recovery compartment, if present, initially is charged with a solution and preferably an aqueous solution. The solution charged to the recovery compartment may or may not contain an ionic compound. An ionic compound is a chemical compound that partially or completely ionizes in solution, such as an electrolyte. Examples of ionic compounds include salts, metal salts and acids or any compound which forms an anion and cation when placed in water. In a preferred embodiment, the ionic compound is the same as the onium salt charged into the feed compartment (or the same as the onium hydroxide recovered from the recovery or feed compartment). In another embodiment, the ionic compound is different from the onium salt charged into the feed compartment. After passing a current through the electrochemical cell, the onium hydroxide may be recovered or otherwise obtained from the recovery compartment at a certain concentration. In one embodiment, the concentration of the onium hydroxide in the recovery compartment is above about 0.5 M. In another embodiment, the concentration of the onium hydroxide in the recovery compartment is above about 1 M. In yet another embodiment, the concentration of the onium hydroxide in the recovery compartment is above about 2 M. These values are applicable to the recovery of onium hydroxide from the feed compartment in embodiments where a recovery compartment is not present in an electrochemical cell. In electrochemical cells containing two or more recovery compartments, the concentrations of the organic hydroxide in the solutions recovered from the recovery compartments may be the same or different for each recovery compartment.

The buffer compartment, if present, contains a solution of an ionic compound at a certain concentration. The buffer compartment containing an ionic compound serves to maintain conductivity and enable lower operating cell voltages. The concentration of the ionic compound in the solution charged into the buffer compartment is in the range from about 0.1 M to about 5 M. In a preferred embodiment, the concentration is from about 0.5 M to about 2 M. And in a most preferred embodiment, the concentration is from about 0.7 M to about 1.5 M. In electrochemical cells containing two or more buffer compartments, the concentrations of the ionic compound in the solutions charged into the buffer compartments may be the same or different for each buffer compartment.

The pass compartment, if present, initially is charged with a solution and preferably an aqueous solution. The solution charged to the pass compartment may or may not contain an ionic compound. The ionic compound, if present, may be the same or different from the ionic compound of the buffer compartment. In most embodiments, the pass compartment is defined by two cation exchange membranes. After passing a current through the electrochemical cell, the onium cation passes through the pass compartment in embodiments where a pass compartment is used. Since most undesirable impurities do not pass through the pass compartment, the pass compartment serves to further purify the resultant onium hydroxide.

The acid compartment is charged with a solution and preferably an aqueous solution. The solution charged to the acid compartment may or may not contain an ionic compound. The ionic compound, if present, may be the same or different from the ionic compound of the buffer compartment. The concentration of the ionic compound in the solution charged into the acid compartment is in the range from about 0.1 M to about 6 M. In a preferred embodiment, the concentration is from about 0.2 M to about 3 M. And in a most preferred embodiment, the concentration is from about 0.5 M to about 1.5 M. After passing a current through the electrochemical cell, the onium cation migrates toward the cathode while onium salt anions pass from the feed compartment to the acid compartment. The acid may be recovered from the acid compartment and re-used, especially in a continuous operation, as the acid contacted with the cation exchange material, after the solution containing an onium hydroxide and/or onium salt is contacted with the cation exchange material.

Several embodiments of electrochemical cells which may be used in the present invention will be described with reference to the figures. Although numerous embodiments of various electrochemical cells are described in the figures, it will be readily apparent to those skilled in the art that additional numerous embodiments not specifically described in the figures exist within the scope of the invention.

An embodiment of an electrochemical cell is illustrated in FIG. 1, which is a schematic representation of an electrochemical cell 10 containing an anode 11, a cathode 12 and a unit cell containing in sequence beginning at the anode 11, an anion selective membrane 13. The electrochemical cell 10 contains two compartments; namely, an acid compartment 14 and a feed compartment 15.

In operation of the electrochemical cell 10 illustrated in FIG. 1, an onium salt is charged to the feed compartment 15. A solution, preferably an aqueous solution, of an ionic compound is charged to the acid compartment 14. An electrical potential is established and maintained between the anode and the cathode to produce a flow of current across the cell whereupon the onium salt anion is attracted toward the anode and passes through the anion selective membrane 13 into the acid compartment 14. The onium cation combines with hydroxide ions in the feed compartment to produce the desired onium hydroxide. Impurities may pass through the anion selective membrane and thus migrate to the acid compartment. Regenerated onium hydroxide is formed and recovered from the feed compartment 15. In a preferred embodiment, acid may be recovered from the acid compartment 14.

Figure 2:
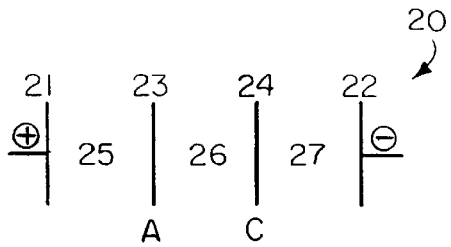
FIG. 2 is a schematic representation of a three compartment electrochemical cell in accordance with the present invention.

Another embodiment of an electrochemical cell is illustrated in FIG. 2, which is a schematic representation of an electrochemical cell 20 containing an anode 21, a cathode 22 and a unit cell containing in sequence beginning at the anode 21, an anion selective membrane 23 and a cation selective membrane 24. The electrochemical cell 20 contains three compartments; namely, an acid compartment 25, a feed compartment 26 and a recovery compartment 27.

In operation of the electrochemical cell 20 illustrated in FIG. 2, an onium salt is charged to the feed compartment 26. A solution, preferably an aqueous solution, of an ionic compound is charged to the acid compartment 25 and the recovery compartment 27. An electrical potential is established and maintained between the anode and the cathode to produce a flow of current across the cell whereupon the onium salt anion is attracted toward the anode and passes through the anion selective membrane 23 into the acid compartment 25. The onium cation is attracted toward the cathode and passes through the cation selective membrane 24 into the recovery compartment where it combines with hydroxide ions to produce the desired onium hydroxide. Impurities are not attracted to the cathode, pass through the anion selective membrane 23, and/or do not pass through the cation selective membrane 24 and thus remain in the feed compartment 26 and/or migrate to the acid compartment 25. Regenerated onium hydroxide is formed and recovered from the recovery compartment 27. In a preferred embodiment, acid may be recovered from the acid compartment 25.

Figure 3:
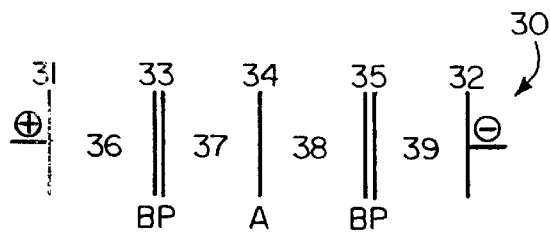
FIG. 3 is a schematic representation of a four compartment electrochemical cell in accordance with the present invention.

Another embodiment of an electrochemical cell is illustrated in FIG. 3, which is a schematic representation of an electrochemical cell 30 containing an anode 31, a cathode 32 and a unit cell containing in sequence beginning at the anode 31, a first bipolar membrane 33, an anion selective membrane 34 and a second bipolar membrane 35. The electrochemical cell contains four compartments; namely, a first buffer compartment 36, an acid compartment 37, a feed compartment 38 and a second buffer compartment 39.

In operation of the electrochemical cell 30 illustrated in FIG. 3, an onium salt is charged to the feed compartment 38. A solution, preferably an aqueous solution, of an ionic compound is charged to the acid compartment 37 and the first and second buffer compartments 36 and 39. An electrical potential is established and maintained between the anode and the cathode to produce a flow of current across the cell whereupon the onium salt anion is attracted toward the anode and passes through the anion selective membrane 34 into the acid compartment 37. The onium cation remains in the feed compartment where it combines with hydroxide ions formed on the anode side of the bipolar membrane to produce the desired onium hydroxide. Impurities may pass through the anion selective membrane 34. Regenerated onium hydroxide is formed and recovered from the feed compartment 38. In a preferred embodiment, acid may be recovered from the acid compartment 37.

Figure 4:
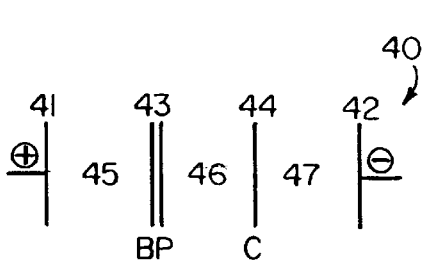
FIG. 4 is a schematic representation of another three compartment electrochemical cell in accordance with the present invention.

Another embodiment of an electrochemical cell is illustrated in FIG. 4, which is a schematic representation of an electrochemical cell 40 containing an anode 41, a cathode 42 and a unit cell containing in sequence beginning at the anode 41, a bipolar membrane 43 and a cation selective membrane 44. The electrochemical cell 40 contains three compartments; namely, a buffer compartment 45, a feed compartment 46 and a recovery compartment 47.

In operation of the electrochemical cell 40 illustrated in FIG. 4, an onium salt is charged to the feed compartment 46. A solution, preferably an aqueous solution, of an ionic compound is charged to the buffer compartment 45 and the recovery compartment 47. An electrical potential is established and maintained between the anode and the cathode to produce a flow of current across the cell whereupon the onium salt anion remains in the feed compartment 46. The onium cation is attracted toward the cathode and passes through the cation selective membrane 44 into the recovery compartment 47 where it combines with hydroxide ions formed on the surface of the cathode to produce the desired onium hydroxide. Impurities are not attracted to the cathode and/or do not pass through the cation selective membrane 44 and thus remain in the feed compartment 46. Regenerated onium hydroxide is formed and recovered from the recovery compartment 47. In a preferred embodiment, acid may be recovered from the feed compartment 46.

Figure 5:
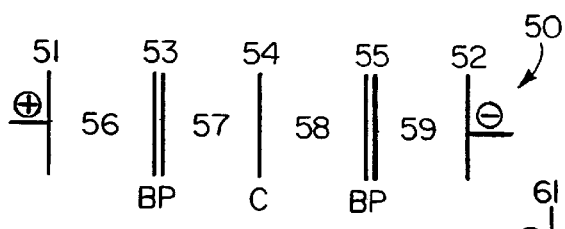
FIG. 5 is a schematic representation of another four compartment electrochemical cell in accordance with the present invention.

Another embodiment of an electrochemical cell is illustrated in FIG. 5, which is a schematic representation of an electrochemical cell 50 containing an anode 51, a cathode 52 and a unit cell containing in sequence beginning at the anode 51, a first bipolar membrane 53, a cation selective membrane 54, and a second bipolar membrane 55. The electrochemical cell 50 contains four compartments; namely, a first buffer compartment 56, a feed compartment 57, a recovery compartment 58, and a second buffer compartment 59.

In operation of the electrochemical cell 50 illustrated in FIG. 5, an onium salt is charged to the feed compartment 57. A solution, preferably an aqueous solution, of an ionic compound is charged to the first and second buffer compartments 56 and 59 and the recovery compartment 58. An electrical potential is established and maintained between the anode and the cathode to produce a flow of current across the cell whereupon the onium salt anion remains in the feed compartment 57. The onium cation is attracted toward the cathode and passes through the cation selective membrane 54 into the recovery compartment 58 where it combines with hydroxide ions formed on the surface of the anode side of the second bipolar membrane 55 to produce the desired onium hydroxide. Impurities are not attracted to the cathode and/or do not pass through the cation selective membrane 54 and thus remain in the feed compartment 57. Regenerated onium hydroxide is formed and recovered from the recovery compartment 58. In a preferred embodiment, acid may be recovered from the feed compartment 57.

Figure 6:
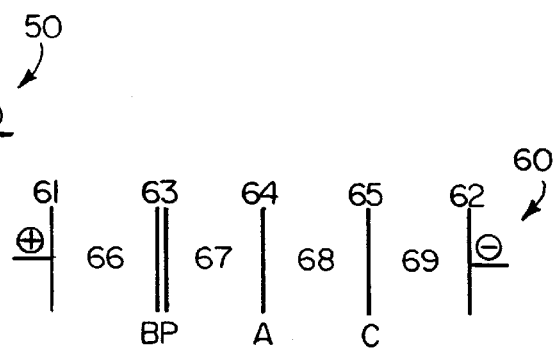
FIG. 6 is a schematic representation of another four compartment electrochemical cell in accordance with the present invention.

Another embodiment of an electrochemical cell is illustrated in FIG. 6, which is a schematic representation of an electrochemical cell 60 containing an anode 61, a cathode 62 and a unit cell containing in sequence beginning at the anode 61, a bipolar membrane 63, an anion selective membrane 64 and a cation selective membrane 65. The electrochemical cell 60 contains four compartments; namely, a buffer compartment 66, an acid compartment 67, a feed compartment 68 and a recovery compartment 69.

In operation of the electrochemical cell 60 illustrated in FIG. 6, an onium salt is charged to the feed compartment 68. A solution, preferably an aqueous solution, of an ionic compound is charged to the buffer compartment 66, the acid compartment 67 and the recovery compartment 69. An electrical potential is established and maintained between the anode and the cathode to produce a flow of current across the cell whereupon the onium salt anion is attracted toward the anode and passes through the anion selective membrane 64 into the acid compartment 67. The onium salt cation is attracted toward the cathode and passes through the cation selective membrane 65 into the recovery compartment 69 where it combines with hydroxide ions to produce the desired onium hydroxide. Impurities are not attracted to the cathode, pass through the anion selective membrane 64, and/or do not pass through the cation selective membrane 65 and thus remain in the feed compartment 68 and/or migrate to the acid compartment 67. Regenerated onium hydroxide is formed and recovered from the recovery compartment 69. In a preferred embodiment, acid may be recovered from the acid compartment 67.

Figure 7:
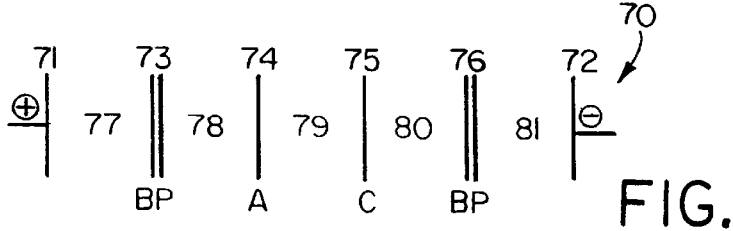
FIG. 7 is a schematic representation of a five compartment electrochemical cell in accordance with the present invention.

Another embodiment of an electrochemical cell is illustrated in FIG. 7, which is a schematic representation of an electrochemical cell 70 containing an anode 71, a cathode 72 and a unit cell containing in sequence beginning at the anode 71, a first bipolar membrane 73, an anion selective membrane 74, a cation selective membrane 75 and a second bipolar membrane 76. The electrochemical cell 70 contains five compartments; namely, a first buffer compartment 77, an acid compartment 78, a feed compartment 79, a recovery compartment 80 and a second buffer compartment 81.

In operation of the electrochemical cell 70 illustrated in FIG. 7, an onium salt is charged to the feed compartment 79. A solution, preferably an aqueous solution, of an ionic compound is charged to the first and second buffer compartments 77 and 81, the acid compartment 78 and the recovery compartment 80. An electrical potential is established and maintained between the anode and the cathode to produce a flow of current across the cell whereupon the onium salt anion is attracted toward the anode and passes through the anion selective membrane 74 into the acid compartment 78. The onium salt cation is attracted toward the cathode and passes through the cation selective membrane 75 into the recovery compartment 80 where it combines with hydroxide ions to produce the desired onium hydroxide. Impurities are not attracted to the cathode, pass through the anion selective membrane 74, and/or do not pass through the cation selective membrane 75 and thus remain in the feed compartment 79 and/or migrate to the acid compartment 78. Regenerated onium hydroxide is formed and recovered from the recovery compartment 80. In a preferred embodiment, acid may be recovered from the acid compartment 78.

Figure 8:
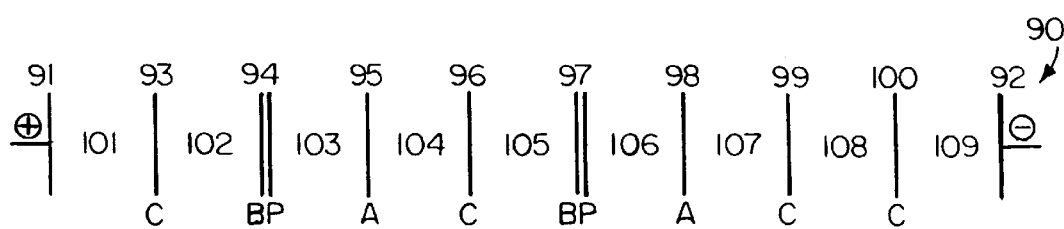
FIG. 8 is a schematic representation of a nine compartment electrochemical cell in accordance with the present invention.

Another embodiment of an electrochemical cell is illustrated in FIG. 8, which is a schematic representation of an electrochemical cell 90 containing an anode 91, a cathode 92 and a unit cell containing in sequence beginning at the anode 91, a first cation selective membrane 93, a first bipolar membrane 94, a first anion selective membrane 95, a second cation selective membrane 96, a second bipolar membrane 97, a second anion selective membrane 98, a third cation selective membrane 99 and a forth cation selective membrane 100. The electrochemical cell 90 contains nine compartments; namely, a first buffer compartment 101, a second buffer compartment 102, a first acid compartment 103, a first feed compartment 104, a first recovery compartment 105, a second acid compartment 106, a second feed compartment 107, a second recovery compartment 108 and a third buffer compartment 109.

In operation of the electrochemical cell 90 illustrated in FIG. 8, an onium salt is charged to the first and second feed compartments 104 and 107. A solution, preferably an aqueous solution, of an ionic compound is charged to the first, second and third buffer compartments 101, 102 and 109, the first and second acid compartments 103 and 106 and the first and second recovery compartments 105 and 108. An electrical potential is established and maintained between the anode and the cathode to produce a flow of current across the cell whereupon the onium salt anion is attracted toward the anode and passes through the first and/or second anion selective membranes 95 and 98 into the first and/or second acid compartments 103 and 106. The onium salt cation is attracted toward the cathode and passes through the second and/or third cation selective membranes 96 and 99 into the first and/or second recovery compartments 105 and 108 where it combines with hydroxide ions to produce the desired onium hydroxide. Impurities are not attracted to the cathode, pass through the first and/or second anion selective membranes 95 and 98, and/or do not pass through the second and/or third cation selective membranes 96 and 99 and thus remain in the first and/or second feed compartments 104 and 107 and/or migrate to the first and/or second acid compartments 103 and 106. Regenerated onium hydroxide is formed and recovered from the first and/or second recovery compartments 105 and 108. In a preferred embodiment, acid may be recovered from the first and/or second acid compartments 103 and 106.

Operation of the process of the present invention may be continuous or batchwise. In a continuous process, acid recovered from the electrochemical cell may be contacted with the cation exchange material to elute the onium salt. Operation of the process of the present invention generally is continuous and certain components are continuously recirculated. Circulation is effected by pumping and/or by gas evolution.

Various materials can be used as anodes in the electrochemical cells. For example, the anode may be made of metals such as titanium-coated electrodes, tantalum, nickel, zirconium, hafnium or alloys of the same. Generally, the anodes will have a non-passivable and catalytic film which may comprise metallic noble metals such as platinum, iridium, rhodium or alloys thereof, or a mixture of electroconductive oxides containing at least one oxide or mixed oxides of a noble metal such as platinum, iridium, ruthenium, palladium or rhodium. In one embodiment, the anode is a dimensionally stable anode such as an anode having a titanium base with ruthenium and/or iridium oxides thereon. In a preferred embodiment, the anode is a dimensionally stable anode having a titanium base with ruthenium oxide thereon.

Various materials which have been used as cathodes in electrochemical cells can be included in the cells used in the above and other embodiments of the present invention. Cathode materials include nickel, iron, stainless steel, nickel plated titanium, graphite, carbon steel (iron) or alloys thereof etc. The term "alloy" is used in a broad sense and includes intimate mixtures of two or more metals as well as one metal coated onto another metal.

The electrochemical cell utilized in the process of the present invention contains at least one ionic selective membrane, and in some embodiments at least one bipolar membrane. Compartments are defined as the area between two of: ionic selective membranes and/or bipolar membranes and/or the anode(s) and/or the cathode(s). The ionic selective membranes and/or bipolar membranes function as diffusion barriers and/or gas separators.

The cation selective membranes used in the cells and the process of the invention may be any of those which have been used in the electrochemical purification or recycling of onium hydroxides. Preferably, the cation exchange membranes should contain a highly durable material such as the membranes based on the fluorocarbon series, or from less expensive materials of the polystyrene or polypropylene series. Preferably, however, the cation selective membranes useful in the present invention include fluorinated membranes containing cation selective groups such as perfluorosulfonic acid and perfluorosulfonic and/perfluorocarboxylic acid, perfluoro-carbon polymer membranes such as sold by the E. I. dupont Nemours & Co. under the general trade designation "Nafion" such as DuPont's Cationic Nafion 902 membrane. Other suitable cation selective membranes include CMV cation selective membranes from Asahi Glass and styrenedivinyl benzene copolymer membranes containing cation selective groups such as sulfonate groups, carboxylate groups, etc. Raipore Cationic R1010, (from Pall RAI), and NEOSEPTA CMH and NEOSEPTA CM1 membranes from Tokuyama Soda are useful particularly with the higher molecular quaternary compounds. The preparation and structure of cation selective membranes are described in the chapter entitled "Membrane Technology" in *Encyclopedia of Chemical Technology*, Kirk-Othmer, Third Ed., Vol. 15, pp. 92–131, Wiley & Sons, New York, 1985. These pages are hereby incorporated by reference for their disclosure of various cation selective membranes which can be useful in the process of the present invention. The use of at least one cation selective membrane in the electrochemical cell is preferred.

Any anion selective membrane may be utilized including membranes used in processes for the desalination of brackish water. Preferably, membranes should be selective with respect to the particular anions present in the cell (e.g., halide ions). The preparation and structure of anionic membranes are described in the chapter entitled "Membrane Technology" in *Encyclopedia of Chemical Technology*, Kirk-Othmer, Third Ed., Vol. 15, pp. 92–131, Wiley & Sons, New York, 1985. These pages are hereby incorporated by reference for their disclosure of various anionic membranes which may be useful in the process of the present invention.

Among the anion selective membranes which may be utilized in the electrochemical cell and which are commercially available are the following: AMFLON, Series 310, based on fluorinated polymer substituted with quaternary ammonium groups produced by American Machine and Foundry Company; IONAC MA 3148, MA 3236 and MA 3475, based on polymer substituted with quaternary ammonium derived from heterogenous polyvinylchloride produced by Ritter-Pfaulder Corp., Permutit Division; Tosflex IE-SF 34 or IE-SA 48 made by Tosoh Corp. which is a membrane designed to be stable in alkaline media; NEOSEPTA AMH, NEOSEPTA ACM, NEOSEPTA AFN or NEOSEPTA ACLE-SP from Tokuyama Soda Co.; and Selemion ASV, Selemion AMV and Selemion AAV from Asahi Glass. In one embodiment, the Tosflex IE-SF 34 and NEOSEPTA AMH anion exchange membranes are preferred because of their stability in alkaline solutions, such as the hydroxide containing solutions which are involved in the process of the invention.

The bipolar membranes used in the electrochemical cells are composite membranes containing three parts: a cation selective side or region, an anion selective side or region, and an interface between the two regions. When a direct current passes across a bipolar membrane, with the cation selective side toward or facing the cathode, electrical conduction is achieved by the transport of H+ and OH- ions which are produced by the dissociation of water which occurs at the interface under the influence of an electrical field.

Bipolar membranes are described, for example, in U.S. Pat. Nos. 2,829,095, 4,024,043 (single film bipolar membranes) and in 4,116,889 (cast bipolar membranes). The bipolar membranes useful in the process of the present invention include NEOSEPTA BIPOLAR 1 by Tokuyama Soda, WSI BIPOLAR, and Aqualytics Bipolar membranes.

The step involving an electrochemical cell is conducted by applying a current (generally direct current) between the anode and the cathode. The current which is passed through the electrochemical cell is a current dictated by the design and performance characteristics of the cell, which are readily apparent to those skilled in the art and/or can be determined by routine experimentation. Current densities between about 10 and about 500 milliamps per square centimeter may be used, and current densities between about 70 and about 300 milliamps per square centimeter are preferred. Higher or lower current densities can be used for certain specific applications. The current density is applied to the cell for a period of time which is sufficient to result in the regeneration or formation of the desired amount or concentration of the onium hydroxide in the feed or recovery compartment.

During the step involving an electrochemical cell, it is generally desirable that the temperature of the liquids within the cell be maintained within the range of from about 2° C. to about 90° C., and preferably from about 20° C. to about 60° C. Also during the step involving an electrochemical cell, it is generally desirable that the pH of the liquids within the cell is either alkaline or acidic. This can be accomplished by adding appropriate amounts of an acid or hydroxide compound to an appropriate compartment(s) of the electrochemical cell. Since the claimed process is a process involving hydroxide ions and/or acid ions, the pH of the cell and each compartment changes as the process is practiced, and in particular, the pH generally increases in the recovery compartment and decreases in the acid compartment as the process is practiced.

Although not wishing to be bound by any theory, operation of the electrochemical cells according to the invention is believed to be based, in part, on the migration of the cation and/or anion of the onium salt, initially charged in the feed compartment, to the recovery or acid compartment as a result of the current applied.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A process for recovering an onium hydroxide from a solution containing an onium compound, comprising:

(A) contacting the solution with a cation exchange material so that at least a portion of onium cations from the onium compound are adsorbed by the cation exchange material;

(B) contacting an acid with the cation exchange material to elute an onium salt;

(C) charging the onium salt to an electrochemical cell comprising at least three compartments, a cathode, an anode, and in order from the anode to the cathode, a bipolar membrane and a cation selective membrane, and passing a current through the cell whereby the onium hydroxide is regenerated; and (D) recovering the onium hydroxide from the cell.

2. The process of claim 1, wherein the onium salt is charged to a feed compartment formed adjacent and on the anode side of the cation selective membrane, and the onium hydroxide is recovered from a recovery compartment formed adjacent and on the cathode side of the cation selective membrane.

3. The process of claim 1, wherein the onium salt eluted in step (B) comprises at least one of an onium bicarbonate, an onium chloride, an onium bromide, an onium nitrate, and an onium sulfate.

4. The process of claim 1, wherein the onium hydroxide comprises a quaternary ammonium hydroxide, a quaternary phosphonium hydroxide or a tertiary sulfonium hydroxide.

5. The process of claim 1, wherein the electrochemical cell comprises at least four compartments, a cathode, an anode, and in order from the anode to the cathode, a bipolar membrane, an anion selective membrane, and a cation selective membrane, the onium salt is charged to a feed compartment formed by the anion selective membrane and the cation selective membrane, and the onium hydroxide is recovered from a recovery compartment formed adjacent and on the cathode side of the cation selective membrane.

6. The process of claim 1, wherein the electrochemical cell comprises at least five compartments, a cathode, an anode, and in order from the anode to the cathode, a first bipolar membrane, an anion selective membrane, a cation selective membrane, and a second bipolar membrane, the onium salt is charged to a feed compartment formed by the anion selective membrane and the cation selective membrane, and the onium hydroxide is recovered from a recovery compartment formed by the cation selective membrane and the second bipolar membrane.

7. The process of claim 6, wherein the acid is recovered from an acid compartment formed by the first bipolar membrane and the anion selective membrane.

8. The process of claim 1, wherein the onium hydroxide comprises a quaternary ammonium hydroxide represented by the formula

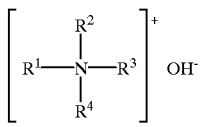

wherein $R^1$, $R^2$, $R^3$ and $R^4$ are each independently alkyl groups containing from 1 to about 10 carbon atoms, aryl groups, or $R^1$ and $R^2$ are alkyl groups which together with the nitrogen atom may form an aromatic or non-aromatic heterocyclic ring provided that if the heterocyclic group contains a —C=N—, $R^3$ is the second bond.

9. The process of claim 1, further comprising concentrating the onium salt which is in a feed compartment formed adjacent and on the anode side of the cation selective membrane.

10. The process of claim 9, wherein concentrating the onium salt is performed by one of reverse osmosis, distillation, nanofiltration and evaporation.

11. A process for recovering an onium hydroxide from a solution containing an onium compound, comprising:
  (A) contacting the solution with a cation exchange material so that at least a portion of onium cations from the onium compound are adsorbed by the cation exchange material;
  (B) contacting an acid with the cation exchange material to elute an onium salt;
  (C) charging the onium salt to an electrochemical cell comprising at least two compartments, a cathode, an anode, and an anion selective membrane therebetween, and passing a current through the cell whereby the onium hydroxide is regenerated; and
  (D) recovering the onium hydroxide from the cell, wherein the solution containing an onium compound further contains impurities, further comprising pretreating the solution containing an onium compound and impurities prior to performing step (A) to remove at least a portion of the impurities.

12. The process of claim 11, wherein the onium salt is charged to a feed compartment formed adjacent and on the cathode side of the anion selective membrane, the onium hydroxide is recovered from the feed compartment, and optionally the acid is recovered from an acid compartment formed adjacent and on the anode side of the anion selective membrane.

13. The process of claim 11, wherein the onium salt eluted in step (B) comprises at least one of an onium bicarbonate, an onium chloride, an onium bromide, an onium nitrate, and an onium sulfate.

14. The process of claim 11, wherein the onium hydroxide comprises a quaternary ammonium hydroxide, a quaternary phosphonium hydroxide or a tertiary sulfonium hydroxide.

15. The process of claim 11, wherein the electrochemical cell comprises at least three compartments, a cathode, an anode, and in order from the anode to the cathode, an anion selective membrane and a cation selective membrane, the onium salt is charged to a feed compartment formed by the anion selective membrane and the cation selective membrane, and the onium hydroxide is recovered from a recovery compartment formed adjacent and on the cathode side of the cation selective membrane.

16. The process of claim 11, wherein the electrochemical cell comprises at least four compartments, a cathode, an anode, and in order from the anode to the cathode, a first bipolar membrane, an anion selective membrane, and a second bipolar membrane, the onium salt is charged to a feed compartment formed by the anion selective membrane and the second bipolar membrane, and the onium hydroxide is recovered from the feed compartment.

17. The process of claim 16, wherein the acid is recovered from an acid compartment formed by the first bipolar membrane and the anion selective membrane.

18. The process of claim 11, wherein the onium hydroxide comprises a quaternary ammonium hydroxide represented by the formula

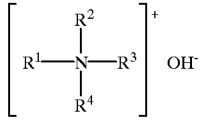

wherein $R^1$, $R^2$, $R^3$ and $R^4$ are each independently alkyl groups containing from 1 to about 10 carbon atoms, aryl groups, or $R^1$ and $R^2$ are alkyl groups which together with the nitrogen atom may form an aromatic or non-aromatic heterocyclic ring provided that if the heterocyclic group contains a —C=N—, $R^3$ is the second bond.

19. The process of claim 11, further comprising concentrating the onium salt which is in a feed compartment formed adjacent and on the anode side of the cation selective membrane.

20. The process of claim 19, wherein concentrating the onium salt is performed by one of reverse osmosis, distillation, nanofiltration and evaporation.

21. A process for recovering a quaternary ammonium hydroxide from a solution containing a quaternary ammonium compound, comprising:
  (A) contacting the solution with a cation exchange material so that at least a portion of the quaternary ammonium cations from the quaternary ammonium compound are adsorbed by the cation exchange material;
  (B) contacting an inorganic acid with the cation exchange material to elute a quaternary ammonium salt;
  (C) charging the quaternary ammonium salt to an electrochemical cell comprising at least four compartments, a cathode, an anode, and in order from the anode to the cathode, a bipolar membrane, an anion selective membrane and cation selective membrane, and passing a current through the cell whereby the quaternary ammonium hydroxide is regenerated; and
  (D) recovering the quaternary ammonium hydroxide from the cell, wherein the solution containing a quaternary ammonium compound further contains impurities, further comprising pretreating the solution containing a quaternary ammonium compound and impurities prior to performing step (A) to remove at least a portion of the impurities.

22. The process of claim 21, wherein the quaternary ammonium salt is charged to a feed compartment formed by the anion selective membrane and the cation selective membrane, and the quaternary ammonium hydroxide is recovered from a recovery compartment formed adjacent and on the cathode side of the cation selective membrane.

23. The process of claim 21, wherein the quaternary ammonium salt eluted in step (B) comprises at least one of a quaternary ammonium bicarbonate, a quaternary ammonium chloride, a quaternary ammonium bromide, a quaternary ammonium nitrate, and a quaternary ammonium sulfate.

24. The process of claim 21, wherein the quaternary ammonium hydroxide comprises at least one of tetramethylammonium hydroxide, tetraethylammonium hydroxide, tetrapropylammonium hydroxide, tetrabutylammonium hydroxide, methyltriethylammonium hydroxide, methyltributylammonium hydroxide, methyltripropylammonium hydroxide, and diethyldimethylammonium hydroxide.

25. The process of claim 21, wherein the electrochemical cell comprises at least five compartments, a cathode, an anode, and in order from the anode to the cathode, a first bipolar membrane, an anion selective membrane, a cation selective membrane, and a second bipolar membrane, the quaternary ammonium salt is charged to a feed compartment formed by the anion and cation selective membranes and the quaternary ammonium hydroxide is recovered from a recovery compartment formed by the cation selective membrane and the second bipolar membrane.

26. The process of claim 25, wherein the inorganic acid is recovered from an acid compartment formed by the first bipolar membrane and the anion selective membrane.

27. The process of claim 21, further comprising concentrating the quaternary ammonium salt in a feed compartment formed by the anion selective membrane and the cation selective membrane.

28. The process of claim 27, wherein concentrating the quaternary ammonium salt comprises removing quaternary ammonium salt solution from the feed compartment, passing the quaternary ammonium salt solution through a reverse osmosis unit, and returning concentrated quaternary ammonium salt solution to the feed compartment.

29. A process for recovering tetramethylammonium hydroxide from a waste solution containing a tetramethylammonium compound, comprising:

(A) contacting the waste solution with a cation exchange resin so that at least a portion of the tetramethylammonium cations from the tetramethylammonium compound are adsorbed by the resin;

(B) contacting an inorganic acid with the cation exchange resin to elute a tetramethylammonium salt;

(C) charging the tetramethylammonium salt to an electrochemical cell comprising at least five compartments, a cathode, an anode, and in order from the anode to the cathode, a first bipolar membrane, an anion selective membrane, a cation selective membrane and a second bipolar membrane, and passing a current through the cell whereby tetramethylammonium hydroxide is regenerated; and (D) recovering tetramethylammonium hydroxide from the cell, wherein the solution containing a tetramethylammonium compound further contains impurities, further comprising pretreating the solution containing a tetramethylammonium compound and impurities prior to performing step (A) to remove at least a portion of the impurities.

30. The process of claim 29, wherein the tetramethylammonium salt is charged to a feed compartment formed by the anion selective membrane and the cation selective membrane, and tetramethylammonium hydroxide is recovered from a recovery compartment formed by the cation selective membrane and the second bipolar membrane.

31. The process of claim 29, wherein the process is continuous, the inorganic acid is recovered from an acid compartment formed by the first bipolar membrane and the anion selective membrane, and the inorganic acid is re-used in step (B).

32. The process of claim 29, wherein the electrochemical cell comprises at least nine compartments, a cathode, an anode, and in order from the anode to the cathode, a first cation selective membrane, a first bipolar membrane, a first anion selective membrane, a second cation selective membrane, a second bipolar membrane, a second anion selective membrane, a third cation selective membrane, and a fourth cation selective membrane, the tetramethylammonium salt is charged to at least one feed compartment formed by the first anion selective membrane and the second cation selective membrane, and the second anion selective membrane and the third cation selective membrane; and tetramethylammonium hydroxide is recovered from at least one recovery compartment formed by the second cation selective membrane and the second bipolar membrane, and the third cation selective membrane and the fourth cation selective membrane.

33. The process of claim 32, wherein the inorganic acid is recovered from at least one acid compartment formed by the first bipolar membrane and the first anion selective membrane, and the second bipolar membrane and the second anion selective membrane.

34. The process of claim 29, further comprising concentrating the tetramethylammonium salt in a feed compartment formed by anion selective membrane and the cation selective membrane.

* * * * *